United States Patent [19]

Karayannis et al.

[11] Patent Number: 5,332,707
[45] Date of Patent: Jul. 26, 1994

[54] OLEFIN POLYMERIZATION AND COPOLYMERIZATION CATALYST

[75] Inventors: Nicholas M. Karayannis; Steven A. Cohen, both of Naperville; Julie L. Ledermann, Geneva, all of Ill.

[73] Assignee: Amoco Corporation, Chicago, Ill.

[21] Appl. No.: 923,036

[22] Filed: Jul. 31, 1992

[51] Int. Cl.$^5$ ............................................... B01J 31/00
[52] U.S. Cl. ..................................... 502/113; 502/120
[58] Field of Search ............................... 502/113, 120

[56] References Cited

U.S. PATENT DOCUMENTS

| 4,109,071 | 8/1978 | Berger et al. | 502/113 X |
| 4,154,701 | 5/1979 | Melquist | 502/113 |
| 4,530,914 | 7/1985 | Ewen et al. | 502/113 |
| 4,540,679 | 9/1985 | Arzoumanidis et al. | 502/111 |
| 4,612,299 | 9/1986 | Arzoumanidis et al. | 502/104 |
| 4,663,404 | 5/1987 | Invernizzi et al. | 502/113 X |
| 4,701,432 | 10/1987 | Welborn | 502/113 |
| 4,866,022 | 9/1989 | Arzoumanidis et al. | 502/120 |
| 4,988,656 | 1/1991 | Arzoumanidis et al. | 502/127 |
| 5,013,702 | 5/1991 | Arzoumanidis et al. | 502/120 |
| 5,032,562 | 7/1991 | Lo et al. | 502/113 X |
| 5,082,817 | 1/1992 | Albizzati et al. | 502/102 |
| 5,084,429 | 1/1992 | Tachibana et al. | 502/113 |

FOREIGN PATENT DOCUMENTS

| 0174116 | 3/1986 | European Pat. Off. | C08F 10/00 |
| 0264169 | 4/1988 | European Pat. Off. | C08F 210/16 |
| 0415704 | 3/1991 | European Pat. Off. | C08F 4/637 |
| 0451876 | 10/1991 | European Pat. Off. | C08F 10/00 |
| 0490584 | 6/1992 | European Pat. Off. | C08F 4/654 |

Primary Examiner—Asok Pal
Attorney, Agent, or Firm—James R. Henes; Wallace L. Oliver

[57] ABSTRACT

A magnesium-containing supported titanium-containing and a hafnium-containing and/or zirconium-containing catalyst or catalyst component for the polymerization or copolymerization of alpha-olefins.

20 Claims, No Drawings

OLEFIN POLYMERIZATION AND COPOLYMERIZATION CATALYST

BACKGROUND OF THE INVENTION

1. Field of the Invention

This invention relates to a catalyst component or catalyst that is useful for the stereoregular polymerization or copolymerization of alpha-olefins and more particularly concerns a magnesium-containing supported titanium-containing catalyst component or catalyst that is useful for producing a homopolymer or copolymer of an alpha-olefin.

2. Discussion of the Prior Art

Although many polymerization and copolymerization processes and catalyst systems have been described for polymerizor copolymerizing alpha-olefins, it is highly desirable to develop a catalyst component or a catalyst that has improved activity for catalyzing such reactions. It is also advantageous to tailor a process and catalyst system to obtain a specific set of properties of a resulting polymer or copolymer product. For example, in certain applications a product with a broader molecular weight distribution is desirable. Such a product has a lower melt viscosity at high shear rates than a product with a narrower molecular weight distribution. Many polymer or copolymer fabrication processes which operate with high shear rates, such as injection molding, oriented film, and thermobonded fibers, would benefit with a lower viscosity product by improving through-put rates and reducing energy costs. Thus, it is highly desirable to develop a catalyst or catalyst component that is useful for producing a homopolymer or copolymer of an alpha-olefin having a broadened molecular weight distribution. Also important is maintaining high activity and low atactic levels such as measured by hexane soluble and extractable materials formed during polymerization or copolymerization.

Magnesium-containing supported titanium halide-based alpha-olefin polymerization or copolymerization catalyst components or catalyst systems containing such components are now well known in the art. Typically, these catalyst components and catalyst systems are recognized for their performance based on activity and stereospecificity. Numerous individual processes or process steps have been disclosed which have as their purpose the provision of improved supported, magnesium-containing, titanium-containing, electron donor-containing olefin polymerization or copolymerization catalysts. More particularly, Arzoumanidis et al., U.S. Pat. Nos. 4,866,022; 4,988,656; and 5,013,702 disclose a method for forming a particularly advantageous alpha-olefin polymerization or copolymerization catalyst or catalyst component that involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane as a morphology controlling agent; 3) reprecipitating such solid particles from a mixture containing a cyclic ether; and 4) treating the reprecipitated particles with a transition metal compound and an electron donor.

Arzoumanidis et al., U.S. Pat. No. 4,540,679 discloses a process for the preparation of a magnesium hydrocarbyl carbonate by reacting a suspension of a magnesium alcoholate in an alcohol with carbon dioxide and reacting the magnesium hydrocarbyl carbonate with a transition metal component. Arzoumanidis et al., U.S. Pat. No. 4,612,299 discloses a process for the preparation of a magnesium carboxylate by reacting a solution of a hydrocarbyl magnesium compound with carbon dioxide to precipitate a magnesium carboxylate and reacting the magnesium carboxylate with a transition metal component.

While each of the processes of the aforesaid U.S. Pat. Nos. 4,540,679; 4,612,299; 4,866,022; 4,988,656; and 5,013,702 affords alpha-olefin polymerization or copolymerization catalysts or catalyst components which have high activity for polymerizing or copolymerizing alpha-olefins to produce homopolymer or copolymer products which have desirable characteristics, it is highly desirable to develop additional alpha-olefin polymerization or copolymerization catalysts or catalyst components—and methods for the manufacture thereof—that have even further improved catalytic activity and that afford polymers or copolymers which also have broadened molecular weight distribution.

For example, Karayannis, Cohen and Ledermann, pending U.S. patent application Ser. No. 07/862,960, filed Apr. 3, 1992, now U.S. Pat. No. 5,227,354, disclose a solid, hydrocarbon-insoluble catalyst or catalyst component and a method of production thereof, which are based on the catalyst or catalyst components and methods of production thereof, respectively, of the aforesaid U.S. Pat. Nos. 4,540,679; 4,612,299; 4,866,022; 4,988,656; and 5,013,702, wherein the resulting catalyst or catalyst component is a product formed by: A. forming a solution of a magnesium-containing species in a liquid, wherein the magnesium-containing species is formed by reacting a magnesium-containing compound with carbon dioxide or sulfur dioxide; B. precipitating solid particles from the solution of the magnesium-containing species by treatment with a titanium halide; and D. treating the precipitated particles with a titanium compound and an electron donor; wherein the treated precipitated particles from Step D comprise magnesium and vanadium components, and wherein vanadium is introduced into at least one of (i) the aforesaid magnesium-containing species in Step A by reacting the magnesium-containing compound or species with a vanadium-containing compound or complex, or (ii) the aforesaid solid particles precipitated in Step B by treatment of the magnesium-containing species with a titanium halide and a vanadium-containing compound or complex; or (iii) the aforesaid precipitated particles treated in Step D by treatment of the precipitated particles with a titanium compound, an electron donor and a vanadium-containing compound or complex that is free of a halide component. Use of the catalyst or catalyst component disclosed in the aforesaid Karayannis, Cohen and Ledermann pending patent application for the polymerization or copolymerization of an alpha-olefin affords polymers or copolymers which have a broadened molecular weight distribution, but such pending patent application does not disclose a substantial increase in catalytic activity for such polymerization or copolymerization.

Similarly Tachibana et al., U.S. Pat. No. 5,084,429 discloses a catalyst for use in polymerization of olefins which comprises a carrier mainly composed of a magnesium compound precipitated from a solution and a catalytic component supported on the carrier and selected from titanium halides, vanadyl halides and vanadium halides is described. The catalyst is obtained by a process which comprises: (A) mixing (a) at least one magnesium compound with (c) a saturated or unsaturated monohydric or polyhydric alcohol for reaction in dissolved state in the presence of (b) carbon dioxide in an inert hydrocarbon solvent to obtain component (A); (B) subjecting the component (A) to mixing and reaction with (d) a titanium and/or a vanadyl halide and/or a vanadium halide of the general formula, $VX_n(OR^8)_{4-n}$ and also with (e) at least one boron compound, silicon compound and/or siloxane compound thereby obtaining solid product (I): (C) reacting the solid product (I) with (f) a cyclic ether with or with $R^{12}OH$ thereby causing dissolution and re-precipitation to obtain solid product (II): and (D) subjecting the solid product (II) to further reaction with (g) component (B) consisting of a titanium halide and/or a vanadyl halide and/or a vanadium halide and/or a $SiX_s(OR^9)_{4-s}$, thereby obtaining solid product (III), followed either by further reaction with a mixture of the component (B) and (h) an electron donor or by reaction of (g) with the solid product (III) obtained by the reaction between the solid product (II) and (h) or (h) with (j) electron donor, thereby obtaining solid product (IV) for use as the catalytic component.

Catalysts for the polymerization of olefins containing other relevant combinations of metal components have also been disclosed. For example, Albizzati et al., U.S. Pat. No. 5,082,817 discloses a catalyst for the polymerization of olefins, obtained by means of the reaction of: (a) a compound of a transition metal, typically titanium, containing at least one metal-halogen linkage, supported on a magnesium halide in the active form, with (b) a compound of titanium, zirconium or hafnium containing at least one metal-carbon linkage. Similarly, Howard et al., U.S. Pat. No. 4,228,263 discloses a catalyst for the polymerization of propylene, which is the reaction product of (a) a metal oxide such as aluminum oxide, titanium oxide, silica and magnesia or physical mixtures thereof, and (b) an organometallic compound of zirconlure, titanium or hafnium.

In addition, polymer or copolymer morphology is often critical and typically depends upon catalyst morphology. Good polymer morphology generally involves uniformity of particle size and shape, a narrow particle size distribution, resistance to attrition and an acceptably high bulk density. Minimization of very small particles (fines) typically is very important especially in gas-phase polymerizations or copolymerizations in order to avoid transfer or recycle line pluggage. Therefore, it is highly desirable to develop alpha-olefin polymerization and copolymerization catalysts and catalyst components that have good morphology, and in particular, a narrow particle size distribution. Another property which is important commercially is the maintenance of an acceptably high bulk density.

OBJECTS OF THE INVENTION

It is therefore a general object of the present invention to provide an improved alpha-olefin polymerization or copolymerization catalyst or catalyst component that affords an improved polymer or copolymer product and an improved process for producing such catalyst or catalyst component.

More particularly, it is an object of the present invention to provide an improved alpha-olefin polymerization or copolymerization catalyst or catalyst component for the production of a polymer or copolymer of an alpha-olefin having a broadened molecular weight distribution.

It is another object of the present invention to provide an improved alpha-olefin polymerization or copolymerization catalyst or catalyst component having improved activity for the production of polymers and copolymers of an alpha-olefin.

Other objects and advantages of the present invention will become apparent upon reading the following detailed description and appended claims.

SUMMARY OF THE INVENTION

These objects are achieved by the solid, hydrocarbon-insoluble catalyst or catalyst component of this invention for the polymerization or copolymerization of alpha-olefins, comprising a product formed by: (A) forming a solution of a magnesium-containing species in a liquid, wherein the magnesium-containing species is formed by reacting a magnesium-containing compound with carbon dioxide or sulfur dioxide; (B) precipitating solid particles from the solution of the magnesium-containing species by treatment with a titanium compound or complex; and (D) treating the precipitated particles with a titanium compound and an electron donor; wherein the treated precipitated particles from Step D comprise a magnesium component, at least one of a hafnium component or a zirconium component, and wherein at least one of hafnium or zirconium is introduced into at least one of (i) the aforesaid magnesium-containing species in Step A by reacting the magnesium-containing compound or species with carbon dioxide or sulfur dioxide and at least one of a hafnium-containing or zirconium-containing compound or complex, or (ii) the aforesaid solid particles precipitated in Step B by treatment of the magnesium-containing species with a titanium compound or complex and at least one of a hafnium or zirconium compound or complex; or (iii) the aforesaid precipitated particles treated in Step D by treatment of the precipitated particles with a titanium compound, an electron donor and at least one of a hafnium or zirconium compound or complex.

The aforesaid objects are also achieved by the method of this invention comprising the aforesaid steps (A), (B) and (D) to make the aforesaid catalyst or catalyst component of this invention.

DETAILED DESCRIPTION OF THE PREFERRED EMBODIMENTS

The solid, hydrocarbon-insoluble catalyst or catalyst component of this invention for the stereoregular polymerization or copolymerization of alpha-olefins comprises the product formed by the process of this invention, which comprises the Step (A) of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is employed, the magnesium-containing species is a hydrocarbyl carbonate or a carboxylate. When sulfur dioxide is employed, the resulting magnesium-containing species is an hydrocarbyl sulfite ($ROSO_2^-$) or an hydrocarbyl sulfinate ($RSO_2^-$). Since the use of carbon dioxide is highly preferred, hereinafter the description is written as if carbon dioxide is used.

When a magnesium alcoholate is employed, the resulting magnesium-containing species is a magnesium hydrocarbyl carbonate. Generally, the magnesium hydrocarbyl carbonate can be prepared by reacting carbon dioxide with the magnesium alcoholate. For example, the magnesium hydrocarbyl carbonate can be formed by suspending magnesium ethoxide in ethanol, adding carbon dioxide until the magnesium ethoxide dissolves forming magnesium ethyl carbonate. If, however, the magnesium ethoxide were suspended instead in 2-ethylhexanol, at least one of magnesium 2-ethylhexyl carbonate, magnesium ethyl carbonate and magnesium ethyl/2-ethylhexyl carbonate is formed. If the magnesium ethoxide is suspended in a liquid hydrocarbon or halohydrocarbon that is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as follows:

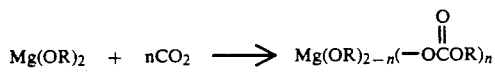

wherein n is a whole number or fraction up to 2, and wherein R is a hydrocarbyl group of 1 to 20 carbon atoms. In addition, a magnesium alcoholate-containing two different aforesaid hydrocarbyl groups can be employed. From the standpoint of cost and availability, magnesium alcoholates which are preferred for use according to this invention are those of the formula $Mg(OR')_2$ wherein R' is as defined above. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 7 to about 12 carbon atoms. Best results are attained through the use of magnesium ethoxide.

Specific examples of magnesium alcoholates that are useful according to this invention include the following: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates can also be employed if desired.

A suitable magnesium hydrocarbyl alcoholate has the formula $MgR(OR')$ wherein R and R' are as defined hereinabove for the magnesium alcoholate. On the one hand, when alcohol is used as the suspending medium for the reaction between the magnesium hydrocarbyl alcoholate and carbon dioxide, the magnesium hydrocarbyl alcoholate is a functional equivalent of the magnesium hydrocarbyl alcoholate because the magnesium hydrocarbyl alcoholate is convened to the magnesium alcoholate in alcohol. On the other hand, when the suspending medium does not contain alcohol, the magnesium hydrocarbyl alcoholate reacts with carbon dioxide as follows:

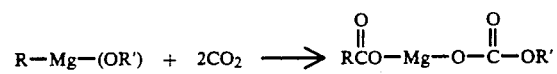

In this case,

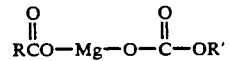

is the resulting magnesium-containing species.

When the magnesium compound from which the magnesium-containing species is formed is a hydrocarbyl magnesium compound having the formula XMgR, where X is a halogen and R is a hydrocarbyl group of 1 to 20 carbon atoms, the reaction of the hydrocarbyl magnesium compound with carbon dioxide forms a magnesium carboxylate and can be represented as follows:

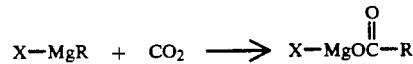

If the hydrocarbyl magnesium compound contains two hydrocarbyl groups, the reaction can be represented as follows:

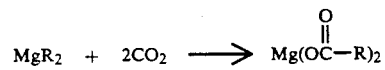

where R is as defined for X-MgR.

The hydrocarbyl magnesium compounds useful in this invention have the structure R-Mg-Q wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for use in this invention are those of the formula $MgR_2$ wherein R is as defined above. In terms of catalytic activity and stereospecificity best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Preferably, the magnesium-containing compound is a magnesium alcoholate, and the resulting magnesium-containing species is a magnesium hydrocarbyl carbonate. For example, a magnesium alcoholate can be employed that is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and so forth; haloalkanes such as 1,1,2-trichloroethane, carbon tetrachloride, etc. aromatics such as xylenes and ethylbenzene; and halogenated and hydrogenated aromatics such as chlorobenzene, o-dichlorobenzene, tetrahydronaphthalene and decahydronaphthalene.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Approximately 0.3 to 4 moles of $CO_2$ are added to the solution or suspension of the magnesium-containing compound with stirring at a temperature of about 0° to 100° C. over a period of approximately 10 minutes to 24 hours.

Regardless of which of the aforesaid magnesium-containing compounds is employed to form the magnesium-containing species, solid particles are next precipitated in Step B from the aforesaid solution of the magnesium-containing species by treatment of the solution with a titanium compound or complex and preferably additionally with a morphology controlling agent. The titanium compound or complex preferably is a titanium (IV) halide and more preferably is titanium tetrachloride. While any convenient conventional morphology controlling agent can be employed, organosilanes are particularly suitable for use as the morphology controlling agent. Suitable organosilanes for this purpose have a formula: $R_nSiR'_{4-n}$, wherein $n = 0$ to 4 and wherein R is hydrogen or an alkyl, alkoxy, haloalkyl or aryl radical containing one to about ten carbon atoms, or a halosilyl-radical or haloalkylsilyl radical containing one to about eight carbon atoms, and R' is OR or a halogen. Typically, R is an alkyl or chloroalkyl radical containing one to about eight carbon atoms and one to about four carbon atoms, and R' is chlorine or an —OR radical containing one to four carbon atoms. A suitable organosilane may contain different R' groups. Mixtures of organosilanes may be used. Preferable organosilanes include tri-methylchlorosilane, trimethylethoxysilane, dimethyldichlorosilane, tetraethoxy-silane, and hexamethyldisiloxane.

The morphology controlling agent can also be an o-, m- or p-dialkylphthalate ester or an o-, m-, or p-alkyl aralkylphthalate ester. Each a moiety of a suitable dialkyl phthalate ester may be the same or different and each contains from 1 to 10, preferably to 4, carbon atoms. Preferably an o-dialkylphthalate ester is employed, more preferably an o-dibutylphthalate ester is employed; and most preferably o-di-n-butylphthalate or o-di-i-butylphthalate is employed. Other suitable dialkylphthalate esters include dihexylphthalate and dioctyiphthalate. In a suitable alkyl aralkylphthalate ester, the alkyl moiety contains from 1 to 10, preferably to 6, carbon atoms and the aralkyl moiety contains from 7 to 10, preferably to 8, carbon atoms. Preferably an o-alkyl aralkylphthalate ester is employed. Suitable alkyl aralkylphthalate esters include benzyl n-butylphthalate and benzyl-i-butylphthalate.

In addition, Cohen et al., U.S. Pat. No. 4,946,816 discloses the use of a $C_8$–$C_{10}$ aromatic compound in the solvent in any of the aforesaid steps Nos. 1), 2) or 3) of the aforesaid U.S. Pat. Nos. 4,866,022; 4,540,679; and 4,612,299, at any time prior to the addition of ether in the aforesaid step 3), in order to control the morphology of the final particles of the resulting catalyst or catalyst component. Particular $C_8$–$C_{10}$ aromatic compounds that are suitable morphology control agents include o-xylene, m-xylene, p-xylene, mixed xylenes, ethylbenzene, naphthalene, cumene, pseudocumene, methylethyl benzenes, tetrahydronaphthalene, and diethylbenzenes. Ethyl benzene, ortho-xylene, meta-xylene, paraxylene and naphthalene are preferred. Mixtures of $C_8$–$C_{10}$ aromatic compounds may also be used. Naphthalene is most preferred. Preferably the $C_8$–$C_{10}$ aromatic compounds are introduced in Step B of the method of their invention, although such aromatics may also be introduced in Step A of the method of this invention or in Step C discussed hereinbelow before addition of the cyclic ether. Typically, from about 1000 to about 20,000 parts by weight or 0.1–2 wt. % of such $C_8$–$C_{10}$ aromatic compounds per million parts of the total amount of material present are incorporated within the solvent to effect the desired morphology change. Preferably, about 2000 to about 10,000 parts per million of such $C_8$–$C_{10}$ aromatic compounds are used. For a solvent incorporating only $C_8$ aromatic compounds, the most preferred range is about 4000 to about 10,000 of $C_8$ aromatic compounds.

The particles precipitated in Step B are treated in Step D with a titanium compound and an electron donor. Titanium (IV) compounds useful in Step D are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Organic electron donors useful in preparation of the stereospecific supported catalyst components of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above, aliphatic alcohols such as methanol, ethanol, propanols, butanols, pentanols, hexanols, and so forth, aliphatic diols and triols such as ethylene glycol, propanediols, glycerol, butanediols, butanediols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and benzophenone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such as methanethiol, ethanethiol, ethanedithiol, propanethiols, butanethiols, butanedithiols, hexanethiols, and the like, thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic adds such as methanesulfonic acid, ethanesulfonic acid, phenylsulfonic add, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are $C_1$–$C_6$ alkyl esters of aromatic carboxylic acids and halogen-, hydroxyl-, oxo-, alkyl, alkoxy-, and/or aryloxy-substituted aromatic monocarboxylic acids. Among these, the alkyl esters of benzoic, halobenzoic, phthalic, terephthalic and isophthalic acids wherein the alkyl group contains 1 to 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, hexyl benzoate, and cyclohexyl benzoate are particularly preferred. Best results are attained through the use of diesters.

The electron donor is preferably an o-, m- or p-dialkylphthalate ester or an o-, m- or p-alkyl aralkylphthalate ester. Each alkyl moiety of a suitable dialkylphthalate ester may be the same or different and each contains from 1 to 10, preferably to 4, carbon atoms. Preferably an o-dialkylphthalate ester is employed, more preferably an o-dibutylphthalate ester is employed; and most preferably o-di-n-butylphthalate or o-di-i-butylphthalate is employed. Other suitable dialkylphthalate esters include dihexylphthalate and dioctylphthalate. In a suitable alkyl aralkylphthalate ester, the alkyl moiety contains from 1 to 10, preferably to 6, carbon atoms and the aralkyl moiety contains from 7 to 10, preferably to 8, carbon atoms. Preferably an o-alkyl aralkylphthalate ester is employed. Suitable alkyl aralkylphthalate esters include benzyl n-butylphthalate and benzyl-i-butylphthalate.

In Step D (the activation step), the particles formed in Step B, the titanium halide compound, and the organic electron donor component are reacted at temperatures ranging from about −10° C. to about 170° C., generally over a period of several minutes to several hours, and are contacted in amounts such that the atomic ratio of titanium to magnesium in the particles (calculated as magnesium in magnesium compound from which the magnesium-containing species is formed) is at least about 0.5:1. Preferably, this ratio ranges from about 0.5:1 to about 20:1. Greater amounts of titanium can be employed without adversely affecting catalyst component performance, but there typically is no need to exceed a titanium to magnesium ratio of about 20:1 as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up from about 1.0 mole per gram atom of titanium in the titanium compound, and preferably from about 0.001 to about 0.6 mole per gram atom of titanium in the titanium compound. Best results are achieved when this ratio ranges from about 0.01 to about 0.3 mole per gram atom of titanium.

It is preferred that the electron donor compound and titanium compound can be contacted with the precipitated solid particles in the presence of an inert hydrocarbon or halogenated diluent, although other suitable techniques can be employed. Suitable diluents am those materials which are disclosed hereinabove as useful as diluents in steps A or B or C (described below) and which are substantially inert to the components employed and am liquid at the temperature employed or can be maintained in the liquid state through the use of elevated pressure.

Preferably, activation Step D is performed as a group of activation substeps in which in Substep D-1, the particles from Step B are treated with titanium tetrachloride and then in Substep D-2 with titanium tetrachloride in the presence of the mixture of the aforesaid first and second electron donors. More preferably, additional treatment involves Substep D-3 with a liquid aromatic hydrocarbon such as toluene and finally in Substep D-4 with titanium tetrachloride. In some instances, in order to obtain a solid catalyst component having the highest activity for the polymerization of copolymerization of alpha olefins, especially propylene, Substep D-3, is repeated as Substep D-3' before Substep D-4 is performed.

In a highly preferred embodiment of the present invention, prior to Step D, the particles precipitated in Step B are reprecipitated in additional Step C from a solution containing a cyclic ether, and then the reprecipitated particles are treated in aforesaid Step D with a transition metal compound and an electron donor. In a typical reprecipitation procedure (Step C), the particles precipitated in Step B are entirely solubilized in the cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles formed in Step B. Also, thioethers such as tetrahydrothiophene can be used. In some instances, such as the use of 2,2,5,5-tetramethyl tetrahydrofuran and tetrahydropyran-2-methanol, reprecipitation occurs upon heating to about 130°–185° F. Other compounds may be used which act in an equivalent manner, i.e., materials which can solubilize the particles formed in Step B and from which solid uniform particles can be reprecipitated, such as cyclohexene oxide, cyclohexanone, ethyl acetate and phenyl acetate. Mixtures of such suitable materials may also be used.

A suitable diluent that can be used in any of the aforesaid Steps A, B or D or in the reprecipitation Step C should be substantially inert to the reactants employed and preferably is liquid at the temperatures employed. It is also contemplated to conduct the particular step in question at an elevated pressure so that lower boiling diluents can be used even at higher temperatures. Typical suitable diluents are aromatic or substituted aromatic liquids, although other hydrocarbon-based liquids may be used. Aromatic hydrocarbons, such as toluene, and substituted aromatics have been found suitable. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G ® which is a $C_{10}$-average isoparaffinic hydrocarbon boiling at 156°–176° C. Other examples of useful diluents include alkanes such as hexane, cyclohexane, methylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid Steps A, B and D and the aforesaid reprecipitation Step C is conducted in the substantial absence of water, oxygen, carbon monoxide, and other extraneous materials capable of adversely affecting the performance of the catalyst or catalyst component of this invention. Such materials are conveniently excluded by carrying out the pretreatment in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, pentene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or purifying other reagents.

As a result of the above-described preparation, there is obtained from Step D a solid reaction product suitable for use as a catalyst or catalyst component. Prior to such use, it is desirable to remove incompletely-reacted starting materials from the solid reaction product from Step D. This is conveniently accomplished by washing the solid from Step D, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

In the solid catalyst component of this invention produced by the method of this invention, the atomic ratio of magnesium to titanium is at least about 0.3:1, and preferably is from about 0.4:1 to about 20:1, and more preferably is from about 0.5:1 to about 3:1. The atomic ratio of silicon to titanium typically can range from about 0.1:1 to about 2.0:1 and preferably is about 0.3:1 to about 1:1.

The catalyst or catalyst component of this invention comprises at least one of a hafnium-containing component or a zirconium-containing component. In the method of this invention for making the catalyst or catalyst component of this invention, the treated precipitated particles from Step D comprise at least one of a hafnium or zirconium component as well as magnesium and titanium components. At least one of the hafnium or zirconium is introduced into at least one of (i) the aforesaid magnesium-containing species in aforesaid Step A by reacting the aforesaid magnesium-containing compound or species with at least one of a hafnium or zirconium-containing compound or complex, or (ii) the aforesaid solid particles precipitated in Step B by treatment of the magnesium-containing species with a titanium compound or complex and at least one of a hafnium or zirconium-containing compound or complex, or (iii) the aforesaid precipitated particles treated in Step D by treatment of the precipitated particles with a titanium compound, an electron donor and at least one of a hafnium or zirconium-containing compound or complex.

In the solid catalyst component of this invention produced by the method of this invention, the atomic ratio of magnesium to hafnium, both calculated as elemental metals, is in the range of from about 2.5:1, preferably from about 15:1, to about 1000:1, preferably to about 35:1, and the atomic ratio of titanium to hafnium, both calculated as elemental metals, is in the range of from about 0.05:1, preferably from about 1:1, to about 100:1. preferably to about 10:1. The atomic ratio of magnesium to zirconium, each calculated as the elemental metal, is in the range of from about 20:1, preferably from about 64:1, to about 925:1, preferably to about 563:1, and the atomic ratio of titanium to zirconium, each calculated as the elemental metal, is in the range of from about 2:1 preferably from about 8:1, to about 130:1, preferably to about 70:1.

The hafnium-containing compound or complex that is employed in Step A, B or D is preferably a hafnium halide, more preferably hafnium tetrahalide. Typically, hafnium tetrachloride or hafnocene dichloride can be employed. Generally, suitable hafnium-containing compounds and complexes include hafnium (IV) complexes in which the hafnium is attached to a carbon or oxygen atom of a ligand, for example, a complex of hafnium tetrachloride with an ether or ester ligand, or halide-free hafnium complexes with alcoholates, β-diketonates, oxalates, acetates, benzoates, phthalates, and hafnium complexes with cyclopentadienyl-derived ligands such as indenyl, fluorenyl, etc.

The zirconium-containing compound or complex that is employed in Step A, B or D, is preferably a zirconium halide, more preferably a zirconium tetrahalide or a zirconocene dihalide. Typically, zirconium tetrachloride, zirconocene dichloride or zirconium acetylacetonate can be employed. Generally, suitable zirconium-containing compounds and complexes include zirconium complexes in which the zirconium is attached to a carbon or oxygen atom or a ligand, for example, halide-free zirconium complexes with alcoholates, β-diketonates, oxalates, acetates, benzoates, phthalates, and zirconium complexes with cyclopentadienyl-derived ligands such as indenyl, fluorenyl, etc.

In one embodiment, at least a portion of the total amount of hafnium introduced into at least one of aforesaid Steps A, B and D is introduced into the aforesaid magnesium-containing species in Step A by reacting the aforesaid magnesium-containing compound or species with a hafnium-containing compound or complex and carbon dioxide. In another embodiment, at least a portion of the total amount of hafnium introduced into at least one of aforesaid Steps A, B and D is introduced into the aforesaid solid particles precipitated in Step B by treatment of the aforesaid magnesium-containing species with a hafnium-containing compound or complex. In a highly preferred embodiment of the present invention, the solid particles precipitated in Step B are treated in Step D with a hafnium-containing compound or complex. More preferably the total amount of hafnium introduced is introduced in Step D.

In a preferred embodiment, at least a portion, more preferably all, of the total amount of zirconium introduced into at least one of aforesaid Steps A, B and D is introduced either in Step B by treatment of the aforesaid magnesium-containing species with a titanium compound or complex and a zirconium-containing compound or complex, more preferably a zirconocene dihalide, or in Step D by treatment of the precipitated particles with a titanium compound, an electron donor and a zirconium tetrahalide.

Preferably, the catalyst or catalyst component of this invention additionally comprises a vanadium-containing component. The vanadium is introduced into at least one of (i) the aforesaid magnesium-containing species in aforesaid Step A by reacting the aforesaid magnesium-containing compound or species with a vanadium-containing compound or complex, or (ii) the aforesaid solid particles precipitated in Step B by treatment of the magnesium-containing species with a titanium compound or complex and a vanadium-containing compound or complex, or (iii) the aforesaid precipitated particles treated in Step D by treatment of the precipitated particles with a titanium compound, an electron donor and of a vanadium-containing compound or complex that is free of a halide component. Notwithstanding the addition of vanadium as described in this paragraph, the hafnium and/or zirconium are introduced as described hereinabove.

In the preferred solid catalyst component of this invention produced by the method of this invention, the atomic ratio of magnesium to vanadium, each calculated as the elemental metal, is in the range of from about 2.5:1, preferably from about 11:1, to about 75:1, preferably to about 65:1, and the atomic ratio of titanium to vanadium, each calculated as the elemental metal, is in the range of from about 0.05:1, preferably from about 1:1, to about 10:1, preferably to about 8:1.

The vanadium-containing compound or complex that is employed to react with the aforesaid magnesium-containing compound in Step A or with the aforesaid magnesium-containing species in Step B is preferably a vanadium III or IV halide, more preferably vanadium trichloride or tetrachloride. Typically, vanadium tetrachloride, vanadium trichloride, solutions of vanadium trichloride in tetrahydrofuran or dichloromethane, vanadium acetylacetonate, and dicyclopentadienyl vanadium dichloride can be employed. Generally, suitable vanadium-containing compounds and complexes include vanadium III or IV complexes in which the vanadium is attached to a carbon or oxygen atom of a ligand, for example, a complex of vanadium trichloride or tetrachloride with an ether or ester ligand, or halide-free vanadium complexes—which are employed exclusively as the means to introduce a vanadium component in Step D—with, for example, alcoloates, β-diketonates, oxalates, acetates, benzoates, phthalates, and vanadium complexes with cyclopentadienyl-derived ligands such as indenyl, fluorenyl, etc.

The hafnium component, the zirconium component and optionally the vanadium component can be introduced in the same Step A, B, or D, or alternatively each aforesaid metal introduced can be introduced in a different step. Preferably the hafnium component is introduced in Step D; and the zirconium component and, if employed, the vanadium component, is introduced in Step B or Step D. When hafnium is the only aforesaid metal introduced and the hafnium is introduced only in Step D, use of the resulting catalyst or catalyst component in the polymerization or copolymerization of an alpha-olefin affords a polymer or copolymer having a broadened molecular weight distribution. When hafnium is the only aforesaid metal introduced and the hafnium is introduced in Step A or B, or in Step A or B as well as in Step D, the resulting catalyst or catalyst component has increased activity in the polymerization or copolymerization of an alpha-olefin but the resulting polymer or copolymer does not have a substantially broader molecular weight distribution. When hafnium is introduced only in Step D and vanadium or zirconium is introduced in Step A or B, use of the resulting catalyst or catalyst component in the polymerization or copolymerization of an alpha-olefin affords a polymer or copolymer having a broadened molecular weight distribution, and, only when the vanadium and/or zirconium is introduced in the form of an inorganic compound or complex, the resulting catalyst or catalyst component has increased activity in the polymerization or copolymerization of an alpha-olefin.

Prepolymerization and encapsulation of the catalyst or catalyst component of this invention can also be carried out prior to being used in the polymerization or copolymerization of alpha olefins. In general, it is highly preferred that the catalyst or catalyst component of this invention is prepolymerized with an alpha-olefin before use as a polymerization or copolymerization catalyst or catalyst component. In polymerization, catalyst or catalyst components of this invention is preferably prepolymerized with an alpha-olefin before use as a polymerization or copolymerization catalyst or catalyst component. In prepolymerization, catalyst or catalyst component and an organoaluminum compound cocatalyst such as triethylaliminum are contacted with an alpha-olefin such as propylene under polymerization conditions, preferably in the presence of a modifier such as a silane and in an inert hydrocarbon such as hexane. Typically, the polymer/catalyst or catalyst component weight ratio of the resulting prepolymerized component is about 0.1:1 to about 20:1. Prepolymerization forms a coat of polymer around catalyst or catalyst component particles which in many instances improves particle morphology, activity, stereospecificity, and attrition resistance. A particularly useful prepolymerization procedure is described in U.S. Pat. No. 4,579,836, which in its entirety is specifically incorporated herein by reference.

Typically, the catalyst or catalyst component of this invention is employed in conjunction with a cocatalyst component including a Group II or III metal alkyl and, typically, one or more modifier compounds. Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those or magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof. If desired, metal alkyls having one or more halogen or hydride groups can be employed, such as ethylaluminum dichloride, diethylaluminum chloride, diethylaluminum hydride, diisobutylaluminum hydride, and the like.

A typical catalyst system for the polymerization or copolymerization of alpha olefins is formed by combining the supported titanium-containing catalyst or catalyst component of this invention and an alkyl aluminum compound, together with at least one cocatalyst or external modifier which is typically an electron donor and, preferably, is a silane. Typically, useful aluminum-to-titanium atomic ratios in such catalyst systems are about 10 to about 500 and preferably about 30 to about 300. Typical aluminum-to-electron donor molar ratios in such catalyst systems are about 2 to about 60. Typical aluminum-to-silane compound molar ratios in such catalyst systems are about 3 to about 50.

To optimize the activity and stereospecificity of this cocatalyst system, it is preferred to employ one or more modifiers, typically electron donors, and including compounds such as silanes, mineral acids, organometallic chalcogenide derivatives of hydrogen sulfide, organic acids, organic acid esters and mixtures thereof.

Organic electron donors that are useful as external modifiers of the aforesaid cocatalyst system are organic compounds containing oxygen, silicon, nitrogen, sulfur, and/or phosphorus. Such compounds include organic adds, organic acid anhydrides, organic acid esters, alcohols, ethers, aldehydes, ketones, silanes, amines, amine oxides, amides, thiols, various phosphorus acid esters and amides, and the like. Mixtures of organic electron donors can also be employed.

Particular organic acids and esters are benzoic acid, halobenzoic acids, phthalic acid, isophthalic acid, terephthalic acid, and the alkyl esters thereof wherein the alkyl group contains 1 to 6 carbon atoms such as methyl chlorobenzoates, butyl benzoate, isobutyl benzoate, methyl anisate, ethyl anisate, methyl p-toluate, hexylbenzoate, and cyclohexyl benzoate, and diisobutyl phthalate as these give good results in terms of activity and stereospecificity and are convenient to use.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: $SiY_4$, wherein each Y group is the same or different and is an alkyl or alkoxy group containing 1 to about 20 carbon atoms. Preferred aliphatic silanes include isobutyltdmethoxysilane, diisobutyldimethoxysilane, diisopropyldimethoxysilane, diphenyl dimethoxysilane, di-t-butyldimethoxysilane, and t-butyldimethoxysilane.

The catalyst or catalyst component of this invention is useful in the stereospecific polymerization or copolymerization of alpha-olefins containing 3 or more carbon atoms such as propylene, butene-1, pentene-1, 4-methylpentene-1, and hexene-1, as well as mixtures thereof and mixtures thereof with ethylene. The catalyst or catalyst component of this invention is particularly effective in the stereospecific polymerization or copolymerization of propylene or mixtures thereof with up to about 20 mole percent ethylene or a higher alpha-olefin. According to the invention, highly crystalline polyalpha-olefin homopolymers or copolymers are prepared by contacting at least one alpha-olefin with the above-described catalyst or catalyst component of this invention under polymerization or copolymerization conditions. Such conditions include polymerization or copolymerization temperature and time, pressure(s) of the monomer(s), avoidance of contamination of catalyst, choice of polymerization or copolymerization medium in slurry processes, the use of additives to control homopolymer or copolymer molecular weights, and other conditions well known to persons skilled in the art. Slurry-, bulk-, and vapor-phase polymerization or copolymerization processes are contemplated herein.

The amount of the catalyst or catalyst component of this invention to be employed varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carded out at temperatures ranging from about 50° C. to about 80° C.

Alpha-olefin polymerization or copolymerization according to this invention is carded out at monomer pressures of about atmospheric or above. Generally, monomer pressures range from about 20 to about 600 psi, although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions. In slurry processes, the polymerization or copolymerization time can be regulated as desired. Polymerization or copolymerization times ranging from about ½ to several hours are generally sufficient in continuous slurry processes.

Diluents suitable for use in slurry polymerization or copolymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene. Chloronaphthalene, ortho-dichlorobenzene, tetrahydro-naphthalene, decahydronaphthalene; high molecular weight liquid paraffins or mixtures thereof, and other well-known diluents. It often is desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For copolymerization, the homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the invented catalyst can be fabricated into useful articles by extrusion, injection molding, and other common techniques.

The invention described herein is illustrated, but not limited, by the following examples.

EXAMPLE 1

Step A - Formation of Magnesium Alkyl Carbonate Solution

Into a two-liter reactor, equipped with a mechanical stirrer and flushed with dry nitrogen, was transferred a mixture of 153 grams of magnesium ethoxide, 276 milliliters of 2-ethyl-1-hexanol and 1100 milliliters of toluene. This mixture was agitated at 450 rpm under 30 psig of carbon dioxide and heated at 93° C. for three hours. The resulting solution was transferred to a two-liter bottle. The total volume of this solution was 1530 milliliters. 1.320 moles of 2-ethylhexanol were employed per mole of magnesium ethoxide. The solution contained 0.10 gram-equivalents of magnesium ethoxide per milliliter.

Step B - Formation of Solid Particles

Into a 1.0-liter reactor was charged 150 milliliters of toluene, 20.5 milliliters of tetraethoxysilane and 14 milliliters of titanium tetrachloride and 0.5 gram of hafnocene dichloride under a blanket of dry nitrogen. After the mixture was stirred at 300 rpm at 22°–27° C. for 15 minutes, 114 milliliters of the Step A magnesium hydrocarbyl carbonate solution was added to the reactor through a bomb. Solid particles precipitated.

Step C - Reprecipitation

After the mixture containing the precipitate was stirred for five additional minutes, 27 milliliters of tetrahydrofuran (THF) were added rapidly through a syringe. The temperature in the reactor increased from 26° C. to 38° C. Whereupon, the stirring was maintained at 300 rpm and the temperature rose to 60° C. within 15 minutes. The first formed solid dissolved in the THF solution. Within about 5 minutes after the THF addition, a solid began to reprecipitate from solution. Stirring was continued for 1 hour at 60° C. after which agitation was stopped and the resulting solid was allowed to settle. Supernatant was decanted and the solid washed two times with 50 milliliter portions of toluene.

Step D - Titanium (VI) Compound Treatment (Activation Step)

To the solid from Step C in the one-liter reactor were added 125 milliliters of toluene and 50 milliliters of titanium tetrachloride in Substep D-1. The resulting mixture was heated to 116° C. within 30 minutes and stirred at 300 rpm for one hour. After stirring stopped, the resulting solid was allowed to settle and the supernatant was decanted. After 150 milliliters of toluene, 50 milliliters of titanium tetrachloride and 1.8 milliliters of di-n-butylphthalate (Ph) were added to the resulting solid in Substep D-2, the mixture was stirred at 300 rpm at 117° C. for 90 minutes, the solid was allowed to settle and supernatant liquid was decanted. After 95 milliliters of toluene were added in Substep D-3, the mixture was heated to 91° C. for 30 minutes. After the agitation was stopped, the solid was allowed to settle and the supernatant decanted. An additional 95 milliliters of toluene were added and the mixture was agitated at 91° C. for 30 minutes, the solid was allowed to settle, and the supernatant was decanted. An additional 63 milliliters of titanium tetrachloride was added in Substep D-4, the mixture heated at 91° C. under agitation for 30 minutes, after which the agitation was stopped, and the supernatant liquid was decanted. The residue was washed four times with 50 milliliter portions of hexane and the solids recovered (4.9 g).

The particle size distribution of the catalyst was measured using a laser diffraction size analyzer (Shimadzu Model SALD-1100) and found to have a particle size distribution (PSD) of $d_{10}$ of 11.2 microns, $d_{50}$ of 22.1 microns, and $d_{90}$ of 34.1 microns. "$d_{10}$," "$d_{50}$," and "$d_{90}$" mean that 10, 50 and 90 percent, respectively, of the particles have particle sizes smaller than 11.2, 22.1 and 34.1 microns, respectively. $d_{50}$ is termed the median particle size.

A batch slurry phase test polymerization of propylene gave a polymer yield up to 29.2 kilograms of polypropylene per gram of magnesium in the catalyst, with 0.93 extractables and 27.2 lbs/ft$^3$ bulk density (BD). The batch slurry phase propylene polymerization evaluation was performed in a two liter reactor with 71° C. at 150 pounds per square inch gauge including 7 millimoles of hydrogen, with stirring at 500 revolutions per minute with a reaction time of 2 hours. Triethylaluminum (TEA) was used as a co-catalyst together with diisobutyldimethoxysilane as an external modifier. The reactor was charged with TEA/modifier, titanium component, hydrogen, and propylene in that order. "Yield" (kilograms of polymer produced per gram of solid catalyst component) was determined by magnesium analysis of the polymer product and in some cases based on the weight of solid catalyst used to polymer produced. "Solubles" were determined by evaporating the solvent from an aliquot of the filtrate to recover the amount of soluble polymer produced and are reported as the weight percent (% Sol.) of such soluble polymer based on the sum of the weights of the solid polymer supported in the filtration and the soluble polymer. "Extractables" were determined by measuring the loss in weight of a dry sample of ground polymer after being extracted in boiling n-hexane for three to six hours and are reported as the weight percent (% Ext.) of the solid polymer removed by the extraction. The viscosity of the solid polymer was measured and reported as the melt flow rate (MFR).

EXAMPLES 2–26

The procedure and values of parameters employed in Example 1 were also employed in Examples 2–26, except as indicated hereinbelow. In Example 2, the procedure of Example 1 was repeated, except that 1.0 gram, rather than 0.5 gram, of hafnocene dichloride was added in Step B. In Example 3, the procedure of Example 1 was repeated, except that 2.0 grams, rather than 0.5 gram, of hafnocene dichloride were added in Step B. In Example 4, the procedure of Example 1 was repeated, except that instead of adding hafnocene dichloride in Step B, 0.5 gram of hafnium tetrachloride in 90 milliliters of toluene, 21 milliliters of 2-ethyl-1-hexanol, and 11.4 grams of magnesium ethoxide were combined in Step A under 30 pounds per square inch pressure of carbon dioxide in a 200 milliliter pressure bottle. In Example 5, the procedure of Example 1 was repeated, except that in addition to the 0.5 gram of hafnocene dichloride added in Step B, 2.0 grams of hafnium tetrachloride were added in Substep D-1. In Example 6, the procedure of Example 5 was repeated, except that 1.0 gram, not 0.5 gram, of hafnocene dichloride was added in Step B. In Example 7, the procedure of Example 1 was repeated, except that 3.0 grams, instead of 0.5 gram, of hafnocene dichloride was added in Step B, and 2.5 grams of hafnium tetrachloride was added in Step D-1.

In Example 8, the procedure of Example 1 was repeated, except that 1.7 milliliters of a 1 molar solution of vanadium trichloride in a mixture of dichloromethane and tetrahydrofuran, instead of 0.5 gram of hafnocene dichloride, were added in Step B, and 2.0 grams of hafnium tetrachloride were added in Substep D-1. In each of Examples 9 and 10, the procedure of Example 8 was repeated, except that, instead of 1.7 milliliters, 2.5 and 3.4 milliliters of the vanadium trichloride solution were added in Step B in Examples 9 and 10, respectively. In Example 11, the procedure of Example 8 was repeated, except that 5.1 milliliters, instead of 1.7 milliliters, of the vanadium trichloride solution were added in Step B, and 1.5 grams, instead of 2.0 grams, of hafnium trichloride were added in Substep D-1.

In each of Examples 12 and 13, the procedure of Example 1 was repeated, except that 1.0 and 1.5 grams of zirconocene dichloride, instead of hafnocene dichloride were added in Step B in Examples 12 and 13, respectively. In Example 14, the procedure of Example 1 was repeated, except that 1.0 gram of zirconocene dichloride, instead of 0.5 gram of hafnocene dichloride, was added in Step B, and 2.0 grams of hafnium tetrachloride was added in Substep D-1. Example 15 was a repeat of Example 14.

In Example 16, the procedure of Example 14 was repeated, except that neither zirconocene dichloride nor hafnocene dichloride was added in Step B, and 4.0 grams, instead of 2.0 grams, of hafnium tetrachloride were added in Substep D-1. In Example 17, the procedure of Example 5 was repeated, except that 1.5 grams, instead of 0.5 gram, of hafnocene dichloride was added in Step B. In Example 18, the procedure of Example 1 was repeated, except that 0.52 gram of vanadocene dichloride, instead of hafnocene dichloride, was added in Step B, and 3.0 gram of hafnium tetrachloride was added in Substep D-1. In Example 19, the procedure of Example 18 was repeated, except that 0.77 gram, instead of 0.52 gram, of vanadocene dichloride was added in Step B, and 2.0 grams of hafnium tetrachloride, instead of 3 grams of hafnium tetrachloride, were added in Substep D-1. In Example 20, the procedure of Example 19 was repeated, except that 0.5 gram of zirconocene dichloride, instead of vanadocene dichloride, was added in Step B, and 1.5 grams, instead of 2.0 grams, of hafnium tetrachloride were added in Substep D-1. In Example 21, the procedure of Example 20 was repeated. In Example 22, the procedure of Example 20 was repeated, except that 1.5 grams, instead of 0.5 gram, of zirconocene dichloride were added in Step B, and 1.0 gram, instead of 1.5 grams, of hafnium tetrachloride was added in Substep D-1.

In Example 23, the procedure of Example 16 was repeated, except that 2.5 grams of zirconium tetrachloride, instead of hafnium tetrachloride were added in Substep D-1. In Example 24, the procedure of Example 18 was repeated, except that 0.4 gram, instead of 0.52 gram of vanadocene dichloride was added in Step B, and 0.5 gram of zirconium tetrachloride, instead of hafnium tetrachloride, was added in Substep D-1.

In Example 25, the procedure of Example 1 was repeated, except that hafnocene dichloride was not added in Step B and 0.5 gram of hafnocene dichloride was added in Substep D-1. In Example 26, the procedure of Example 1 was repeated, except that hafnocene dichloride was not added in Step B, 2.4 milliliters, instead of 1.8 milliliters, of di-n-butylphthalate were added in Substep D-2, Substep D-3[1] was eliminated, and 125 milliliters, instead of 63 milliliters, of titanium tetrachloride was added in Substep D-4. Thus, Examples 25 and 26 are comparative examples illustrating catalysts that were prepared either without the use of a hafnium compound at all or with an organic hafnium compound added only in Step D.

The amount of the aforesaid materials employed in the aforesaid steps and substeps in the preparation, and the metals content, of the resulting solid catalyst components are presented in Table 1. The molar ratios of magnesium to a second metal in Step A are presented in Table 1 only when a second metal is employed in Step A, that is, in Example 4. The particle size distributions of the resulting solid catalyst components are presented in Table 2. The yield of polypropylene from the aforesaid batch slurry phase test polymerization, the % Sol., % Ext., BD, MFR, $M_n$, $M_w$, $M_z$, $M_{z+1}$ and $M_w$, $M_n$ for the polypropylene produced in each such batch slurry phase test polymerization are also presented in Table 2.

TABLE 1

| | Amounts of Materials Employed in the Preparation of the Solid Catalyst Component | | | | | | | Metals Content[3] of the Resulting Solid Catalyst Component | | | | |
|---|---|---|---|---|---|---|---|---|---|---|---|---|
| | | | In Substep D- | | | | | | | | | |
| Example No. | Mg/Met[1] Step A | Mg/Ti/Met[1] In Step B | Mg/Ti/Met[1] 1 | Mg/Ti/Ph[1] 2 | Toluene[2] 3 | Toluene[2] 3' | Ti/Cl$_4$[2] 4 | Ti | Additional Metal | Mg | Cl | Ph |
| 1 | | 1/1.5/0.07 | 1/5/0 | 1/5/0.3 | 95 | 95 | 63 | 2.12 | 0.014 | 18.4 | | |
| 2 | | 1/1.5/0.13 | 1/5/0 | 1/5/0.3 | 95 | 95 | 63 | 2.47 | 0.02 | 17.1 | | |
| 3 | | 1/1.5/0.27 | 1/5/0 | 1/5/0.3 | 95 | 95 | 63 | 2.95 | 0.02 | 17.9 | | |
| 4 | 1/0.08 | 1/1.5/0 | 1/5/0 | 1/5/0.3 | 95 | 95 | 63 | 1.90 | 0.15 | 18.8 | | |
| 5 | | 1/1.5/0.07 | 1/5/0.31 | 1/5/0.3 | 95 | 95 | 63 | 2.23 | 1.5 | 18.7 | 54.0 | 11.58 |
| 6 | | 1/1.5/0.13 | 1/5/0.31 | 1/5/0.3 | 95 | 95 | 63 | 2.08 | 0.69 | 17.7 | | |
| 7 | | 1/1.5/0.40 | 1/5/0.39 | 1/5/0.3 | 95 | 95 | 63 | 4.2 | 0.61 | 19.4 | | |
| 8 | | 1/1.5/0.03 | 1/5/0.31 | 1/5/0.3 | 95 | 95 | 63 | 2.06 | 0.83/0.25[4] | 16.9 | | |
| 9 | | 1/1.5/0.04 | 1/5/0.31 | 1/5/0.3 | 95 | 95 | 63 | 2.08 | 1.0/0.34[4] | 18.3 | | |
| 10 | | 1/1.5/0.06 | 1/5/0.31 | 1/5/0.3 | 95 | 95 | 63 | 2.24 | 1.11/0.47[4] | 17.4 | | |
| 11 | | 1/1.5/0.09 | 1/5/0.24 | 1/5/0.3 | 95 | 95 | 63 | 1.5 | 0.59/1.15[4] | 17.0 | | |
| 12 | | 1/1.5/0.17 | 1/5/0 | 1/5/0.3 | 95 | 95 | 63 | 2.71 | 0.04 | 17.2 | | |
| 13 | | 1/1.5/0.26 | 1/5/0 | 1/5/0.3 | 95 | 95 | 63 | 2.12 | 0.03 | 18.0 | | |
| 14 | | 1/1.5/0.17 | 1/5/0.31 | 1/5/0.3 | 95 | 95 | 63 | 2.25 | 0.45/0.05[5] | 16.4 | | |
| 15 | | 1/1.5/0.17 | 1/5/0.31 | 1/5/0.3 | 95 | 95 | 63 | 1.79 | 0.62/0.05[5] | 17.4 | | |
| 16 | | 1/1.5/0 | 1/5/0.63 | 1/5/0.3 | 95 | 95 | 63 | 1.64 | 1.93 | 16.7 | 54.0 | 10.04 |
| 17 | | 1/1.5/0.20 | 1/5/0.31 | 1/5/0.3 | 95 | 95 | 63 | 2.39 | 0.97 | 16.9 | | |
| 18 | | 1/1.5/0.10 | 1/5/0.47 | 1/5/0.3 | 95 | 95 | 63 | 1.99 | 2.69/0.93[4] | 17.1 | | |
| 19 | | 1/1.5/0.15 | 1/5/0.31 | 1/5/0.3 | 95 | 95 | 63 | 2.16 | 3.13/1.54[4] | 17.2 | | |
| 20 | | 1/1.5/0.09 | 1/5/0.24 | 1/5/0.3 | 95 | 95 | 63 | 2.24 | 0.61/0.27[5] | 17.2 | | |
| 21 | | 1/1.5/0.09 | 1/5/0.24 | 1/5/0.3 | 95 | 95 | 63 | 2.09 | 0.5/0.02[5] | 18.1 | | |

TABLE 1-continued

| | | Amounts of Materials Employed in the Preparation of the Solid Catalyst Component | | | | | | Metals Content[3] of the Resulting Solid Catalyst Component | | | |
|---|---|---|---|---|---|---|---|---|---|---|---|
| | | In Substep D- | | | | | | | | | |
| Example No. | Mg/Met[1] Step A | Mg/Ti/Met[1] In Step B | Mg/Ti/Met[1] 1 | Mg/Ti/Ph[1] 2 | Toluene[2] 3 | Toluene[2] 3' | Ti/Cl₄[2] 4 | Ti | Additional Metal | Mg | Cl | Ph |
| 22 | 1/1.5/0.26 | 1/5/0.16 | 1/5/0.3 | 95 | 95 | 63 | 2.13 | 0.38/0.17[5] | 17.9 | | |
| 23 | | 1/1.5/0 | 1/5/0.50 | 1/5/0.3 | 95 | 95 | 63 | 2.04 | 0.84 | 18.3 | | |
| 24 | | 1/1.5/0.08 | 1/5/0.10 | 1/5/0.3 | 95 | 95 | 63 | 1.81 | 0.31/0.54[6] | 16.2 | | |
| 25 | | 1/1.5/0 | 1/5/0.07 | 1/5/0.3 | 95 | 95 | 63 | 2.37 | 0.03 | 17.1 | | |
| 26 | | 1/1.5/0 | 1/5 | 1/5/0.45 | 95 | 0 | 125 | 2.58 | 0 | 18.3 | | |

Footnotes:
[1] molar ratio
[2] milliliters
[3] weight percent
[4] wt. % Hf/wt. % V
[5] wt. % Hf/wt. % Zr
[6] wt. % Zr/wt. % V
[7] wt. % Zr

TABLE 2

| Example No. | Yield | MFR | Mn | Mw | Mz | Mz + 1 | Mw/Mn |
|---|---|---|---|---|---|---|---|
| 1 | 29,205 | 5.3 | 70.4 | 365 | 1142 | 2361 | 5.5 |
| 2 | 33,580 | 14.5 | 61.2 | 321 | 1032 | 2236 | 5.2 |
| 3 | 41,630 | 5.6 | 64.2 | 336 | 1087 | 2249 | 5.3 |
| 4 | 25,065 | 14.7 | 61.8 | 315 | 979 | 2051 | 5.1 |
| 5 | 30,655 | 12.0 | 53.9 | 293 | 916 | 1858 | 5.4 |
| 6 | 27,230 | 10.9 | 55.0 | 296 | 943 | 1932 | 5.4 |
| 7 | 33,160 | 7.5 | 60.9 | 320 | 1008 | 2063 | 5.2 |
| 8 | 37,375 | 13.5 | 47.6 | 264 | 834 | 1759 | 5.5 |
| 9 | 37,350 | 4.3 | 61.8 | 368 | 1239 | 2650 | 5.9 |
| 10 | 27,635 | 4.9 | 66.5 | 397 | 1480 | 3435 | 5.9 |
| 11 | 36,960 | 6.7 | 53.4 | 306 | 968 | 2014 | 5.7 |
| 12 | 25,295 | 5.0 | 65.7 | 366 | 1179 | 2481 | 5.5 |
| 13 | 29,035 | 6.2 | 64.0 | 338 | 1047 | 2124 | 5.2 |
| 14 | 23,770 | 6.5 | 62.7 | 348 | 1202 | 2742 | 5.5 |
| 15 | 28,070 | 10.8 | 57.4 | 324 | 1107 | 2528 | 5.6 |
| 16 | 19,880 | 9.5 | 55.6 | 331 | 1104 | 2374 | 6.0 |
| 17 | 18,210 | 1.8 | 83.9 | 517 | 1805 | 3725 | 6.1 |
| 18 | 19,215 | 4.5 | 58.7 | 443 | 1882 | 4060 | 7.5 |
| 19 | 16,700 | 3.1 | 62.5 | 460 | 1848 | 3910 | 7.3 |
| 20 | 25,670 | 4.5 | 63.2 | 388 | 1308 | 2814 | 6.1 |
| 21 | 24,955 | 0.86 | 98.4 | 619 | 2072 | 3751 | 6.3 |
| 22 | 24,190 | 3.0 | 73.0 | 443 | 1456 | 2931 | 6.1 |
| 23 | 17,770 | 1.3 | 79.7 | 570 | 2000 | 3547 | 7.1 |
| 24 | 17,055 | 9.9 | 87.2 | 546 | 2005 | 3839 | 6.2 |
| 25 | 20,855 | 12.2 | 60.6 | 289 | 861 | 1716 | 4.7 |
| 26 | 23,415 | 6.0 | 67.1 | 376 | 1264 | 2747 | 5.6 |

Examples 25 and 26 illustrate catalysts which are similar to the catalysts prepared in Examples 1–24, except that they contain either no hafnium, zirconium or vanadium at all or contain hafnium which was incorporated therein by adding hafnocene dichloride in Step D-1. By comparison, the substantial improvements in catalytic activity in Examples 1–15, in affording a polymer product having a broadened molecular weight distribution in Examples 16–19, 23 and 24, and in both catalytic activity and affording a polymer product having a broadened molecular weight distribution in Examples 20–22 illustrate the benefits of the catalyst of the present invention.

From the above description, it is apparent that the objects of the present invention have been achieved. While only certain embodiments have been set forth, alternative embodiments and various modifications will be apparent from the above description to those skilled in the art. These alternatives are considered equivalents and within the spirit and scope of the present invention.

Having described the invention, what is claimed is:

1. A solid, hydrocarbon-insoluble catalyst or catalyst component for the polymerization of propylene or copolymerization of propylene with up to 20 mole percent of ethylene or a higher alpha-olefin, comprising a product formed by:

A. forming a solution of a magnesium-containing species in a liquid, wherein the magnesium-containing species is formed by reacting a magnesium-containing compound with carbon dioxide or sulfur dioxide;

B. precipitating solid particles from the solution of the magnesium-containing species by treatment with a titanium compound or complex; and D. treating the precipitated particles with a titanium compound and an electron donor;

wherein the treated precipitated particles from Step D comprise a magnesium component and at least one of a hafnium component or a zirconium component, and wherein at least one of hafnium or zirconium is introduced into at least one of (i) the aforesaid magnesium-containing species in Step A by reacting the magnesium-containing compound or species with carbon dioxide or sulfur dioxide and at least one of a hafnium-containing or zirconium-containing compound or complex, or (ii) the aforesaid solid particles precipitated in Step B by treatment of the magnesium-containing species with a titanium compound or complex and at least one of a hafnium or zirconium compound or complex; or (iii) the aforesaid precipitated particles treated in Step D by treatment of the precipitated particles with a titanium compound, an electron donor and at least one of a hafnium or zirconium compound or complex.

2. The catalyst or catalyst component of claim 1 wherein the magnesium-containing compound in Step A is reacted with carbon dioxide.

3. The catalyst or catalyst component of claim 2 wherein the atomic ratio of magnesium to titanium, both calculated as elemental metals, in the treated precipitated particles formed in Step D is in the range of from about 0.3:1 to about 20:1.

4. The catalyst or catalyst component of claim 2 wherein the atomic ratio of titanium to hafnium, both calculated as elemental metals, in the treated precipitated particles formed in Step D is in the range of from about 0.05:1 to about 100:1.

5. The catalyst or catalyst component of claim 2 wherein the atomic ratio of magnesium to hafnium, both calculated as elemental metals, in the treated precipitated particles formed in Step D is in the range of from about 2.5:1 to about 1000:1.

6. The catalyst or catalyst component of claim 2 wherein the hafnium-containing compound or complex employed in Step A or B is a hafnium halide.

7. The catalyst or catalyst component of claim 6 wherein the hafnium-containing compound or complex employed is hafnium tetrachloride or hafnocene dichloride.

8. The catalyst or catalyst component of claim 2 wherein the total amount of hafnium introduced in at least one of Steps A, B and D is introduced in Step D.

9. The catalyst or catalyst component of claim 1 wherein the atomic ratio of magnesium to zirconium, both calculated as elemental metals, in the treated precipitated particles formed in Step D is in the range of from about 20:1 to about 925:1.

10. The catalyst or catalyst component of claim 1 wherein the atomic ratio of titanium to zirconium, both calculated as elemental metals, in the treated precipitated particles formed in Step D is in the range of from about 2:1 to about 130:1.

11. The catalyst or catalyst component of claim 1 wherein the zirconium-containing compound or complex employed is a zirconium tetrahalide or a zirconocene dihalide.

12. The catalyst or catalyst component of claim 1 wherein at least a portion of the total amount of zirconium introduced in at least one of Steps A, B and D is introduced in Step B by treatment of the magnesium-containing species with a titanium compound or complex and zirconocene dichloride or in Step D by treatment of the precipitated particles with a titanium compound, an electron donor and a zirconium tetrahalide.

13. The catalyst or catalyst component of claim 2 wherein the treated precipitated particles from Step D comprise a magnesium component, at least one of a hafnium component or a zirconium component and additionally a vanadium component, and wherein the vanadium is introduced into at least one of (i) the aforesaid magnesium-containing species in Step A by reacting the magnesium-containing compound or species with a vanadium-containing compound or complex, or (ii) the aforesaid solid particles precipitated in Step B by treatment of the magnesium-containing species with a titanium compound or complex and a vanadium-containing compound or complex; or (iii) the aforesaid precipitated particles treated in Step D by treatment of the precipitated particles with a titanium compound, an electron donor and a vanadium-compound or complex that is free of a halide component.

14. The catalyst or catalyst component of claim 13 wherein the total amount of vanadium introduced is introduced in at least one of Step B or D.

15. The catalyst or catalyst component of claim 13 wherein the atomic ratio of titanium to vanadium, each calculated as the elemental metal, in the treated precipitated particles formed in Step D is in the range of from about 0.05:1 to about 10:1.

16. The catalyst or catalyst component of claim 13 wherein the atomic ratio of magnesium to vanadium, each calculated as the elemental metal, in the treated precipitated particles formed in Step D is in the range of from about 2.5:1 to about 75:1.

17. The catalyst or catalyst component of claim 13 wherein the vanadium-containing compound or complex employed is vanadium (III) or vanadium (IV) halide.

18. The catalyst or catalyst component of claim 13 wherein at least a portion of the total amount of vanadium introduced in at least one of Steps A, B and D is introduced into the solid particles precipitated in Step B by treatment of the magnesium-containing species with a titanium compound or complex and a vanadium-containing compound or complex.

19. The catalyst or catalyst component of claim 13 wherein at least a portion of the total amount of vanadium introduced in at least one of Steps A, B and D is introduced in Step D by treatment of the precipitated particles with a titanium compound, an electron donor and a vanadium compound or complex that is free of a halide component.

20. The catalyst or catalyst component of claim 2 wherein the solid particles precipitated in Step B are next dissolved and reprecipitated in Step C from a cyclic ether and then the reprecipitated particles are treated in Step D with a transition metal compound and an electron donor.

* * * * *

UNITED STATES PATENT AND TRADEMARK OFFICE
CERTIFICATE OF CORRECTION

PATENT NO. : 5,332,707                                               Page 1 of 2
DATED       : July 26, 1994
INVENTOR(S) : Nicholas M. Karayannis, Steven A. Cohen,
              Julie L. Ledermann It is certified that error appears in the above-indentified patent and that said Letters Patent is hereby corrected as shown below:

| Col. | Line | |
|---|---|---|
| 5 | 66 | "alcoholate is convened" should read --alcoholate is converted-- |
| 7 | 57 | "four carbon atoms," should read --four chlorine atoms,-- |
| 7 | 67 | "Each a moiety" should read --Each alkyl moiety-- |
| 8 | 6 | "dioctyiphthalate." should read --dioctylphthalate.-- |
| 9 | 10 | "butanediols," should read --butanetriols,-- |
| 10 | 12 | "organosulfonic adds" should read --organosulfonic acids-- |
| 10 | 13 | "phenylsulfonic add," should read --phenylsulfonic acid,-- |
| 11 | 16 | "Suitable diluents am those" should read --Suitable diluents are those-- |

UNITED STATES PATENT AND TRADEMARK OFFICE
CERTIFICATE OF CORRECTION

PATENT NO. : 5,332,707
DATED : July 26, 1994
INVENTOR(S) : Nicholas M. Karayannis, Steven A. Cohen, Julie L. Ledermann It is certified that error appears in the above-indentified patent and that said Letters Patent is hereby corrected as shown below:

| Col. | Line | |
|---|---|---|
| 11 | 20 | "am liquid" should read --are liquid-- |
| 16 | 42 | "organic adds," should read --organic acids,-- |
| 16 | 65 | "isobutyltdmethoxysilane," should read --isobutyltrimethoxysilane,-- |
| 16 | 68 | "t-butyldimethoxysilane." should read --t-butyltrimethoxysilane.-- |
| 17 | 48 | "this invention is carded out" should read --this invention is carried out-- |
| 20 | 30 | "an aliquot of the filtrate" should read --an allquot of the filtrate-- |

Signed and Sealed this

Twenty-fifth Day of October, 1994

BRUCE LEHMAN

Attest:

Attesting Officer

Commissioner of Patents and Trademarks